J. E. CAPS.
STEAM CONDENSER, WATER HEATER, AND OIL SEPARATOR.
APPLICATION FILED FEB. 15, 1908.

949,217.

Patented Feb. 15, 1910.
2 SHEETS—SHEET 1.

Witnesses
Jas. W. McCathran

John E. Caps,
Inventor

By E. G. Siggers
Attorney

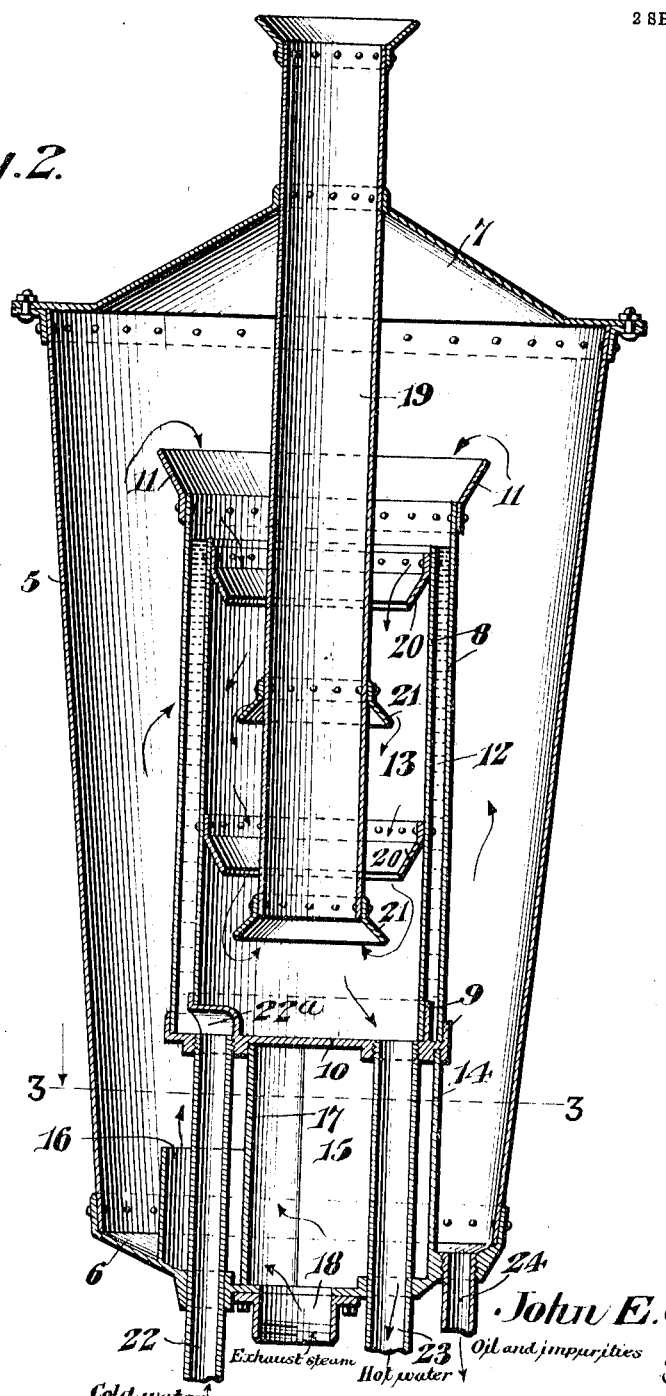

UNITED STATES PATENT OFFICE.

JOHN E. CAPS, OF CHICAGO, ILLINOIS, ASSIGNOR OF ONE-HALF TO CHAPIN A. CARTWRIGHT, OF CHICAGO, ILLINOIS.

STEAM-CONDENSER, WATER-HEATER, AND OIL-SEPARATOR.

949,217. Specification of Letters Patent. Patented Feb. 15, 1910.

Application filed February 15, 1908. Serial No. 416,122.

*To all whom it may concern:*

Be it known that I, JOHN E. CAPS, a citizen of the United States, residing at Chicago, in the county of Cook and State of Illinois, have invented a new and useful Steam-Condenser, Water-Heater, and Oil-Separator, of which the following is a specification.

The principal object of the present invention is to provide novel, simple and effective means for condensing steam, the heat of the steam condensed being utilized in raising the temperature of water, said means being furthermore arranged to separate oil and other impurities from the steam.

The preferred form of construction is illustrated in the accompanying drawings, wherein:—

Figure 1:
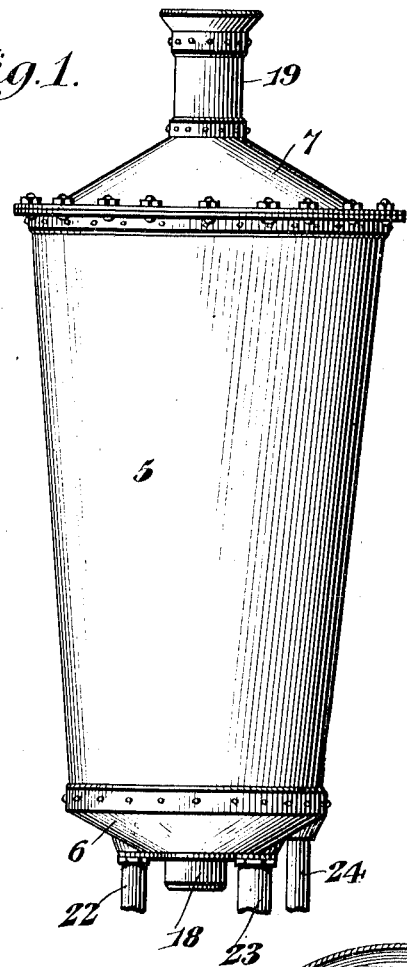
Figure 4:
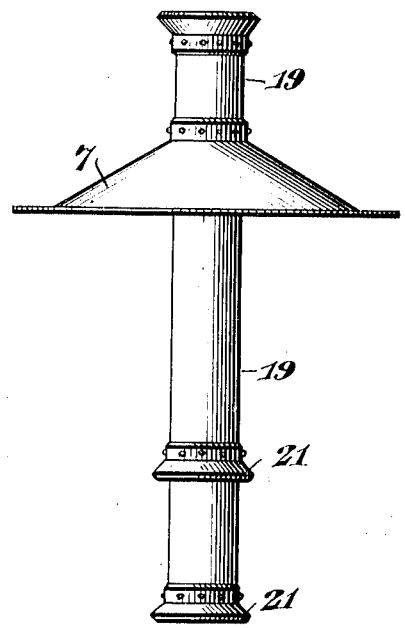
Figure 3:
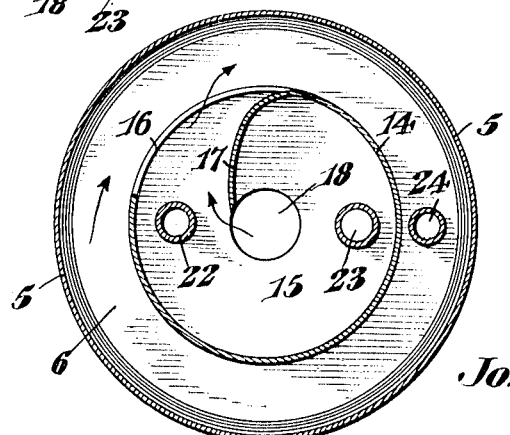

Figure 1 is a side elevation of the apparatus. Fig. 2 is a vertical sectional view therethrough on an enlarged scale. Fig. 3 is a horizontal sectional view on the line 3—3 of Fig. 2. Fig. 4 is a detail side elevation of the top of the casing and the exhaust conduit or pipe.

Similar reference numerals designate corresponding parts in all the figures of the drawings.

In the embodiment illustrated, an outer casing is employed comprising an upwardly flared cylindrical wall 5 having a bottom 6 and a top 7 secured thereto, the latter being substantially conical in form. Within the casing in spaced relation to the walls thereof, is a device which serves as a combined water heater and steam-condensing element, as a collecting chamber for the heated water and water of condensation, and as a reservoir for the inflowing water to be heated and to act as the cooling or condensing medium. This device is a unitary structure suitably mounted in the casing so that the steam flows in contact with its exterior walls, whereby surface-condensing is produced, and it also discharges water so as to mingle with the steam for obtaining a jet-condensing action. The said device consists of a tubular water containing wall comprising spaced inner and outer cylindrical shells 8 secured to the upstanding flanges 9 of a bottom 10, the outer wall projecting above the inner wall and having a flared flange 11 fastened to its upper edge. As a result of this construction, a water space 12 is formed between the shells 8, said water space having a closed bottom and an open top, while within the tubular wall is formed a steam passageway 13 having an open top and a closed bottom.

When it is desired to combine with the foregoing structure, a means for separating oil and other impurities from the steam, it is preferable to provide a special form of drum or wall between the said unitary device and bottom of the casing, as will be hereinafter more fully described, but it is to be understood that certain features of the invention can be carried out without the use of the oil separating means. The tubular water containing wall is supported by another tubular wall or drum 14 located between the bottoms 6 and 10, forming a steam chamber 15, which is provided in one side with a discharge opening 16. A deflector wall 17 is located within the chamber at one side of the opening.

The steam to be condensed, from any suitable source, as for instance, the exhaust steam from an engine is conducted through a pipe which is connected to a nipple 18 depending from the bottom 6 of the outer casing, the bore of said nipple communicating with the bottom of the chamber 15.

An exhaust conduit or pipe 19 projecting through the top 7, depends within the casing 5 through the open upper end of the steam passageway 13, and has its lower inlet end located within said steam passageway above the bottom 10 of the tubular or liquid containing wall. As will be seen by reference to Fig. 2, the diameter of the pipe or conduit 19 is considerably less than the diameter of the inner shell 8, and being disposed centrally of said shell, is spaced therefrom on all sides. The said inner shell 8 has secured thereto at intervals downwardly and inwardly inclined deflector flanges 20 located around the pipe or conduit 19, and said pipe or conduit has downwardly and outwardly inclined deflector flanges 21, one of which is located between the flanges 20, these flanges terminating respectively short of the conduit and the inner shell. As a result, a tortuous passageway is produced. Cold water is introduced into the water or liquid chamber 12 through a suitable pipe 22 leading through the bottom 6 of the casing and connected to the bottom 10 of the tubular wall. An inclined wall 22ª is located directly over and at one side of the upper end of the pipe 22 and serves to cause the inflowing water to gyrate in the wall and prevent the settlement of sediment. A discharge pipe 23 for the hot water, leads from the bottom 10 of the water containing wall within the inner shell 8 and extends through the bottom 6. A draw-off pipe 24 for oil and other impurities is connected to the bottom 6 of the casing outside the wall 14.

The operation of the structure is substantially as follows. Cold water, introduced through the pipe 22, will fill the water chamber 12, and overflowing the top thereof, will drip over the flanges 20 and 21. If now, steam is introduced through the nipple 18, the same will pass outwardly through the opening 16, and being deflected by the wall 17 will have a gyratory movement around the water containing wall. Passing over the top of this wall, it will enter the steam pasageway 13, and as it moves downwardly, it will be deflected by the flanges 20 and 21, first against the conduit 19 and then against the water containing wall, thus passing through the spray of water. The result is that the greater portion of the steam will be condensed, and at the same time, the water will be heated. The combined water of condensation and water that has passed over the top of the inner shell 8, will escape through the pipe 23, while the remaining vapor will exhaust through the conduit 19. It will thus be evident that a very simple structure is produced, in which the steam will be effectively condensed and the heat will be taken up by the water which acts as the condensing agent. The steam blowing up against the bottom of the heater, which is provided with a number of downwardly extending portions, deposits nearly all of the oil contained in the steam and what little remains is forced against the walls of the outer receptacle or outer wall of the heater before the steam rises into the upper portion of the casing preparatory to its descent through the condensing steam passage. The oil and heavy impurities which will separate from the steam during the passage of such steam around the outer face of the water containing wall, will gravitate into the bottom of the outer casing and can be drawn off through the pipe 24. With this construction, the various walls are preferably constructed of non-corrosive material, and therefore there is nothing which is apt to clog up or become inoperative.

Another of the advantages due to my construction is that the water in the water space 12 being forced from the bottom upward and having a circular motion will never get hot enough to form any deposits of lime to clog it. A heater constructed as described and having an interior water chamber 12 has been used where the water was thirty-two per cent. hardness, and during the course of nearly a year has never been clogged by any deposits. This is an important point, as in most constructions of this character there is a constant tendency to clog and a tendency for any lime which may be in the water to be deposited. The gyratory motion of the water is due to the fact that it enters at an angle by reason of inlet pipe 22$^a$, and thus has a circular and upward motion through the chamber 12 until it eventually passes over the inner wall of the chamber and downward through the steam condensing passage 13.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In an apparatus of the class described, the combination of a casing having an inlet and an outlet, with a single structure mounted therein and shaped to constitute a combined surface and jet condensing element and also a feed water heater and collecting chamber for the water of condensation and condensing water, means connected with the device for supplying water thereto for condensing the steam and to be heated thereby, and a discharge conduit connected with the collecting chamber of the device for drawing off the water adapted to collect in said chamber.

2. In an apparatus of the class described, the combination of a casing having an inlet and outlet for steam, a water wall mounted in the casing and coöperating with the latter to form a passage through which steam is adapted to flow along one side of the wall and then along the second side, a steam exhaust conduit having its receiving end disposed to receive steam after it has passed along the second side of the water wall and conducting said steam out of the casing through the said outlet, means arranged to supply water to the said wall, said wall being open at its top to provide an overflow along the second side of the water wall, and oppositely-disposed deflecting devices arranged between the said wall and exhaust conduit to deflect the water and steam back and forth between the water wall and conduit.

3. In an apparatus of the class described, the combination of a casing having an inlet and outlet, a water wall mounted in and spaced from the casing and inclosing a steam passageway communicating with the space surrounding the water wall whereby steam is conducted successively along the outside and inside of the water wall, an exhaust conduit having its receiving end disposed within the said passageway for conducting the steam through the said outlet, said water wall consisting of inner and outer shells inclosing a water space, the inner shell being of less height than the outer for permitting an overflow of water into the said passageway, a water supply conduit connected with the said water space, and a hot water outlet conduit for receiving the overflow water and water of condensation.

4. In an apparatus of the class described, the combination of a casing having an inlet and outlet, a water wall mounted in and spaced from the casing and inclosing a steam passageway communicating with the space surrounding the water wall whereby steam is conducted successively along the outside and inside of the water wall, an exhaust conduit having its receiving end disposed within the said passageway for conducting the steam through the said outlet, said water wall consisting of inner and outer shells inclosing a water space, the inner shell being of less height than the outer for permitting an overflow of water into the said passageway, a water supply conduit connected with the said water space, a hot water outlet conduit for receiving the overflow water and water of condensation, and deflectors arranged in staggered relation in the said passageway and mounted respectively on the said inner shell and exhaust conduit for directing the steam and water back and forth between the water wall and exhaust conduit while traversing the said passageway.

5. In an apparatus of the class described, the combination of a casing having an inlet and outlet, a water wall mounted in and spaced from the casing and inclosing a steam passageway communicating with the space surrounding the water wall whereby steam is conducted successively along the outside and inside of the water wall, an exhaust conduit having its receiving end disposed within the said passageway for conducting the steam through the said outlet, said water wall consisting of inner and outer shells inclosing a water space, the inner shell being of less height than the outer for permitting an overflow of water into the said passageway, a water supply conduit connected with the said water space, a hot water outlet conduit for receiving the overflow water and water of condensation, and a device at the juncture between the water supply pipe and water wall for imparting a gyratory motion to the water in rising in the said water wall.

6. In an apparatus of the class described, the combination of a casing having an inlet and outlet, a water-containing receptacle mounted within and separate from the casing and consisting of spaced shells over which the steam successively passes in transit through the casing from the inlet to the outlet whereby the said element forms a surface condenser, one of the said shells being lower than the other for causing water to overflow along such shell, and means adjacent the said wall whereby the steam condenses by contact with the said shell and also by commingling with the overflow water, and an outlet conduit connected with the said element for draining off the overflow water and water of condensation.

7. In an apparatus of the class described, the combination of a casing having an inlet and outlet, a cylindrical water wall closed at its bottom to form a collecting chamber disposed above and spaced from the inlet, said water wall inclosing a passageway, a drum arranged between the bottom of the casing and said water wall and having an opening through which steam passes to flow around the water wall, said drum coöperating with the bottom portion of the casing to form an oil-collecting chamber, a drain conduit connected with the oil-collecting chamber, an exhaust conduit extending into the passageway and having its inlet end adjacent the bottom of the passageway, said water wall being open at its top to permit water to flow down the inside thereof, a plurality of deflectors mounted on the water wall and conduit in staggered relation for deflecting the overflow water and steam back and forth between the conduit and inner surface of the water wall, means for conducting away the overflow water and water of condensation from the collecting chamber, a water supply conduit connected with the water wall, and means in the water wall located at the bottom thereof for causing the water to rise in the water wall with a gyratory motion.

8. In an apparatus of the class described, the combination of a casing having a steam inlet and an outlet, a liquid-containing wall in the casing of tubular form for inclosing a steam passageway closed at one end, said wall being provided with a liquid discharge overflowing into the passageway, an exhaust conduit extending into the passageway and conducting exhaust steam out of the casing through the said outlet, and a discharge pipe opening into the bottom of the said passageway for conducting off the overflow water and water of condensation.

9. In an apparatus of the class described, the combination of a casing having a steam inlet pipe at its bottom, a water wall supported in the casing in spaced relation thereof and inclosing a steam passageway, said water wall consisting of inner and outer shells inclosing a water space closed at its bottom and opening at its top into the said passageway to permit water to overflow into the latter, a bottom plate disposed over the said inlet pipe and closing the water wall, an exhaust conduit having its receiving end extending into the passageway and spaced from the said bottom plate and its outer end discharging into the atmosphere, means for supplying water to the water wall at a point nearest the steam inlet pipe and arranged to direct the water in a gyratory course upwardly through the water wall, and means connected with the said bottom plate for drawing off the overflow water and water of condensation collecting in the said passageway.

10. In an apparatus of the class described, the combination of a casing having a steam inlet, a water wall located within the casing in spaced relation thereto and inclosing a steam passage, a plate closing the lower end thereof, said wall being open at its upper end to allow water to flow over the inside thereof, an exhaust conduit extending through the top of the casing and into the lower portion of said steam passage, a drum supporting the said water wall having an outlet opening at one side, a pipe for supplying water to the water wall, and means for withdrawing water from the closed end of the steam passage.

11. In an apparatus of the class described, the combination with an upstanding upwardly flared casing having a top and bottom, of a tubular liquid containing wall located within the casing and comprising inner and outer sections, and a bottom that is spaced from the bottom of the casing, a tubular wall located between the bottoms forming a steam receiving chamber, said wall having an opening in one side communicating with the interior of the casing, an upright steam exhaust pipe extending through the top of the casing and depending within the tubular wall, oppositely arranged deflector flanges carried by the tubular wall and the exhaust pipe and over which the overflow water from the water-containing wall passes by gravity, means for introducing steam into the chamber, means for introducing cold water into the water containing wall, and discharge pipes connected to the bottom of the water containing wall and to the bottom of the casing outside of the lower tubular wall.

12. In an apparatus of the class described, a pair of concentric walls arranged in proximity to each other to form an annular water chamber, the inner wall being of less height than the outer wall to permit water to overflow, and means at the bottom of the water chamber arranged to direct water into the latter with a rotary motion around the axis of the chamber and simultaneously with the upward movement of the water, in combination with a casing inclosing the said walls and having a steam inlet and an exhaust outlet.

13. In an apparatus of the class described, the combination of a casing having an inlet at its bottom and an outlet at its top, a water wall composed of spaced inner and outer shells inclosing a steam passageway, the inner shell being of less height than the outer shell to permit water to flow over the top edge of the inner shell and down the inner surface of the latter, a bottom plate closing the space between the shells and also closing the lower end of the passageway to form a collecting chamber, an exhaust conduit extending into the passageway and having its receiving end spaced from the said bottom plate, oppositely-disposed deflecting flanges on the conduit and inner shell for deflecting the overflow water and steam back and forth, separate pipes connected with the bottom plate for supplying water to the space between the shells and conducting away water from the said chamber respectively, and a device on the bottom plate for imparting a gyratory motion to the water supplied between the said shells.

In testimony, that I claim the foregoing as my own, I have hereto affixed my signature in the presence of two witnesses.

JOHN E. CAPS.

Witnesses:
CHAPIN A. CARTWRIGHT,
A. F. POWERS.